United States Patent
Faibish et al.

(10) Patent No.: US 10,095,701 B1
(45) Date of Patent: Oct. 9, 2018

(54) TRANSLATION-BASED NAME NODE CONFIGURATION FOR OBJECT ACCESS IN A MULTI-TIER STORAGE SYSTEM

(71) Applicant: EMC Corporation, Hopkinton, MA (US)

(72) Inventors: Sorin Faibish, Newton, MA (US); John M. Bent, Los Alamos, NM (US); Dennis Ting, Groton, MA (US); Uday Gupta, Westford, MA (US); Percy Tzelnic, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 385 days.

(21) Appl. No.: 14/871,160

(22) Filed: Sep. 30, 2015

(51) Int. Cl.
*G06F 17/30* (2006.01)
(52) U.S. Cl.
CPC .. *G06F 17/30123* (2013.01); *G06F 17/30138* (2013.01); *G06F 17/30194* (2013.01); *G06F 17/30339* (2013.01)
(58) Field of Classification Search
CPC ......... G06F 17/30194; G06F 17/30123; G06F 17/30339; G06F 17/30138
USPC .................................................. 707/827, 803
See application file for complete search history.

(56) References Cited

U.S. PATENT DOCUMENTS

| | | | | |
|---|---|---|---|---|
| 7,464,103 B2* | 12/2008 | Siu | ........................... | G06F 21/10 707/999.102 |
| 7,873,619 B1* | 1/2011 | Faibish | ............. | G06F 17/30091 707/705 |
| 8,200,719 B2* | 6/2012 | Agrawal | ........... | G06F 17/30115 707/821 |
| 8,315,995 B1* | 11/2012 | Levy | ................. | G06F 17/30132 707/694 |
| 8,392,482 B1* | 3/2013 | McAlister | ......... | G06F 17/30584 707/899 |
| 9,762,670 B1* | 9/2017 | Grove | ............... | G06F 17/30312 |

(Continued)

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.

(Continued)

*Primary Examiner* — Phong H Nguyen
(74) *Attorney, Agent, or Firm* — Ryan, Mason & Lewis, LLP

(57) ABSTRACT

An apparatus comprises a multi-tier storage system having a front-end storage tier, a back-end storage tier and a data mover module coupled to the front-end and back-end storage tiers and configured to control movement of data between the storage tiers. A translator at least partially incorporated in or otherwise associated with the multi-tier storage system implements a plurality of translation services and one or more index tables. A given one of the translation services is configured to access at least one of the index tables in order to determine a dynamically loadable namespace identifier associated with an application running on an analysis node that communicates with the multi-tier storage system over at least one network, and to instantiate a name node corresponding to the dynamically loadable namespace identifier. Particular objects of an object store of the back-end storage tier are made accessible to the application via the name node.

20 Claims, 7 Drawing Sheets

(56) References Cited

U.S. PATENT DOCUMENTS

| | | | |
|---|---|---|---|
| 2006/0095458 A1* | 5/2006 | Siu | G06F 21/10 |
| | | | 707/999.102 |
| 2007/0043747 A1* | 2/2007 | Benton | G06F 17/30067 |
| | | | 707/E17.01 |
| 2009/0070382 A1* | 3/2009 | Agrawal | G06F 17/30115 |
| | | | 707/E17.01 |
| 2009/0307451 A1* | 12/2009 | Abzarian | G06F 12/1483 |
| | | | 711/163 |
| 2013/0227194 A1 | 8/2013 | Kannan et al. | |
| 2015/0301743 A1* | 10/2015 | Nagao | G06F 11/34 |
| | | | 711/113 |

OTHER PUBLICATIONS

EMC Corporation, "EMC Tiered Storage for SAP: a New Way to Optimize with Use Cases for EMC Symmetrix VMAX with Fast and Virtual LUN," White Paper, Applied Technology, May 2010, 14 pages.

* cited by examiner

FIG. 5

| DLN NAME | OID ON OBJECT STORE | PERMISSIONS ACLs | RELATED DLN's OID | CHECKSUM OF DLN OBJECT/TAR FILE | SHARING STATUS | LOCATION FLAG |
|---|---|---|---|---|---|---|
| SPICE-1-DLN.v1 | 2.16.840.1.113883.3.1 | nasadmin | NONE | d41d8cd98f00b204e9 800998ecf8427e | SHARED | CT, FT |
| SPICE-1-DLN.v2 | 2.16.840.1.113883.3.2 | nasadmin | 2.16.840.1.113883.3.1 | d41d8cd98f00b204e9 800998ecf8427f | SHARED | FT |
| SPICE-2-DLN.v1 | 2.16.840.1.113883.2.1 | root | 2.16.840.1.113883.3.1 2.16.840.1.113883.3.2 | 68b329da9893e34099 c7d8ad5cb9c940 | UNSHARED | TRANSLATOR |
| BLAST-DLN.v1 | 2.16.840.1.113883.4.1 | nfsnobody | 2.16.840.1.113883.3.1 | d41d8cd98f00b204e9 800998ecf8427e | SHARED | CT |
| ... | | | | | | |
| FIRERAD-DLN.v2 | 2.16.840.1.113883.8.1 | wheel | 2.16.840.1.113883.4.1 | 41d8cd98f00b204e980 0998ecf8427e | UNSHARED | CT, TRANSLATOR |
| | | | | | | |

500

TRANSLATION-BASED NAME NODE CONFIGURATION FOR OBJECT ACCESS IN A MULTI-TIER STORAGE SYSTEM

FIELD

The field relates generally to information processing systems, and more particularly to information processing systems that incorporate multi-tier storage systems.

BACKGROUND

Storage systems are often configured to include multiple storage tiers, with different ones of the tiers providing different levels of input-output (JO) performance or other characteristics. In such systems, data may be moved from one tier to another within a given storage system based on access frequency of the data or other factors.

These and other types of storage systems may incorporate one or more object stores. In an object store, data is exposed and managed in the form of objects instead of files or blocks. Different objects can include different amounts and types of unstructured data but each object is identified by a globally unique identifier. Objects can therefore be stored in a flat address space such as a storage pool. The unique identifier of a given object allows an application or other requesting entity to retrieve that object without needing to know the physical location in which the object is stored. Accordingly, object stores abstract away complexities associated with lower level storage functions.

Object stores are often utilized in cloud storage environments. Examples of cloud-based object stores include Amazon Web Services (AWS), Simple Storage Service (S3), Google Cloud Platform (GCP) Cloud Storage, and Microsoft Azure Blob Storage.

SUMMARY

Illustrative embodiments of the present invention provide information processing systems that include multi-tier storage systems with translation-based name node generation to facilitate application access to objects of an object store implemented in one of the storage tiers of the multi-tier storage system. For example, some of the illustrative embodiments implement translation-based generation of name nodes of a Hadoop distributed file system (HDFS) in a 2 TIERS™ storage system, although other types of name nodes and multi-tier storage systems can be used in other embodiments.

In one embodiment, an apparatus comprises a multi-tier storage system having a front-end storage tier, a back-end storage tier and a data mover module coupled to the front-end and back-end storage tiers and configured to control movement of data between the storage tiers. A translator at least partially incorporated in or otherwise associated with the multi-tier storage system implements a plurality of translation services and one or more index tables. A given one of the translation services is configured to access at least one of the one or more index tables in order to determine a dynamically loadable namespace identifier associated with an application running on an analysis node that communicates with the multi-tier storage system over at least one network, and to instantiate a name node corresponding to the dynamically loadable namespace identifier. Particular objects of an object store of the back-end storage tier are made accessible to the application via the name node.

The translator via the translation services and the at least one index table permits applications running on respective analysis nodes having no knowledge of the object storage structure of the object store to access a specified set of objects corresponding to the dynamically loadable namespace identifier.

Such arrangements allow for translation-based controlled partitioning of an object store such that an individual application can access only a limited number of the objects associated with a corresponding dynamically loadable namespace. However, the total number of objects that can be controlled across multiple applications using respective dynamically loadable namespaces is essentially unlimited. Accordingly, some embodiments are scalable to essentially unlimited numbers of objects that may be stored in one or more object stores of at least one back-end storage tier. Also, the use of one or more index tables each of which can illustratively be configured as a superblock index table object allows all of the objects of the object store to be addressed as a unified namespace.

Some embodiments therefore overcome drawbacks of conventional practice which would otherwise prevent applications running on analysis nodes from directly accessing objects stored in an object store of a capacity tier or other back-end storage tier. Applications in such embodiments can therefore easily identify and access the particular objects that are needed for their execution even though the applications have no knowledge of the structure of the object store in which those objects reside.

These and other illustrative embodiments include, without limitation, methods, apparatus, systems, and processor-readable storage media.

BRIEF DESCRIPTION OF THE DRAWINGS

FIG. 5 shows an example of an index table of a translator in an illustrative embodiment.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
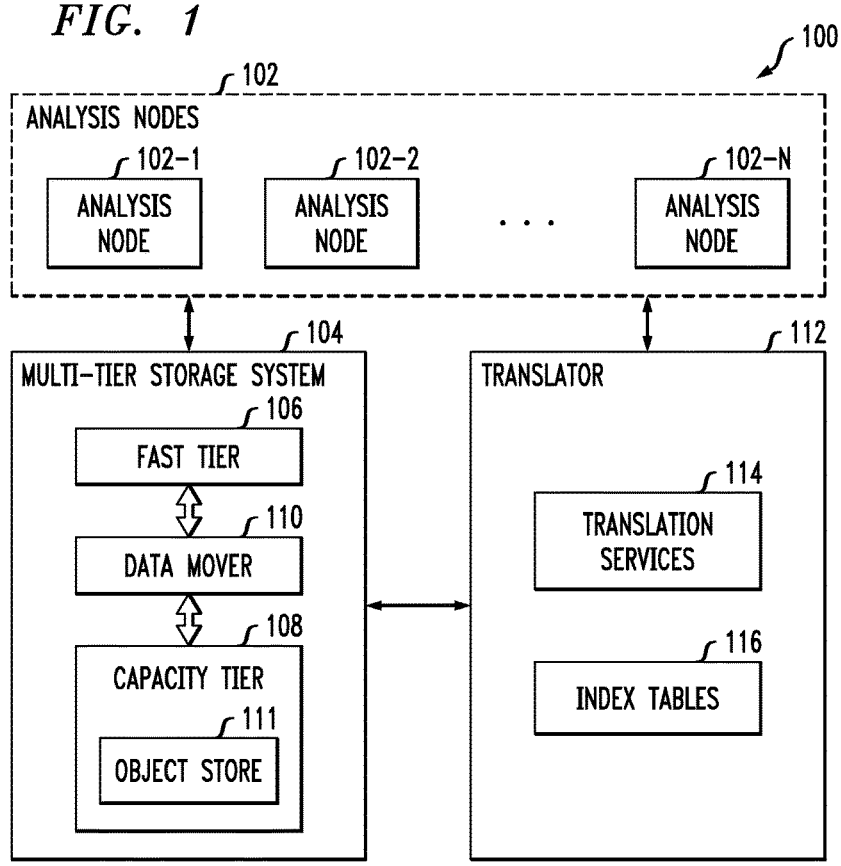
FIG. 1 is a block diagram of an information processing system comprising a multi-tier storage system and an associated translator for configuring a name node in an illustrative embodiment of the invention.

FIG. 1 shows an information processing system 100 configured in accordance with an illustrative embodiment of the present invention. The information processing system 100 comprises a plurality of analysis nodes 102, individually denoted as 102-1, 102-2, . . . 102-N, which access a multi-tier storage system 104. The multi-tier storage system 104 comprises a fast tier 106, a capacity tier 108, and a data mover module 110 coupled to the fast and capacity tiers 106 and 108 and configured to control movement of data between those storage tiers.

The fast and capacity tiers 106 and 108 are examples of what are more generally referred to herein as respective front-end and back-end storage tiers. Accordingly, the multi-tier storage system 104 illustratively comprises multiple hierarchical storage tiers for use in hierarchical storage management (HSM).

The capacity tier 108 in this embodiment comprises an object store 111. The object store 111 stores objects identified by respective object identifiers (OIDs). The object store may be implemented, for example, as an Atmos/ViPR® object store comprising a combination of Atmos object-based storage and ViPR® Software-Defined Storage (SDS) both commercially available from EMC Corporation of Hopkinton, Mass. A wide variety of other types of object stores can be used.

The analysis nodes 102 are assumed to communicate with the multi-tier storage system 104 over at least one network, which is not explicitly shown in the figure. The analysis nodes 102 may comprise respective computers in a cluster of computers associated with a supercomputer or other high performance computing (HPC) system. The term "analysis node" as used herein is intended to be broadly construed, and such nodes in some embodiments may comprise respective compute nodes. Applications running on such nodes are referred to herein as "analysis applications" but such applications are also intended to be broadly construed so as to encompass any applications that involve utilization of objects associated with a dynamically loadable namespace as disclosed herein.

The system 100 further comprises a translator 112 associated with the multi-tier storage system 104. The translator 112 is illustratively shown as being coupled to the analysis nodes 102 and the multi-tier storage system 104. The translator 112 implements translation services 114 that utilize a set of index tables 116.

Although shown as a separate component in this embodiment, the translator 112 in other embodiments can be implemented at least in part within the multi-tier storage system 104 or within another system component. Accordingly, the translator can be implemented, for example, in a distributed matter, in which portions of the translator are implemented in respective other components of the system 100.

By way of example, in one possible distributed implementation of the translator 112, at least a subset of the translation services 114 of the translator 112 can be implemented on respective ones of the analysis nodes 102 that run respective applications and are configured to access the multi-tier storage system 104 over at least one network in conjunction with running of the respective applications.

Other types of distributed implementations of the translator 112 are possible. For example, at least a subset of the translation services 114 of the translator 112 can be implemented on respective servers that are separate from the analysis nodes 102.

Also, other translator configurations can include only single instances of one or both of the translation services 114 and the index tables 116 rather than plural instances of these translator elements as illustrated in the figure.

A given one of the translation services 114 is configured to access at least one of the one index tables 116 in order to determine a dynamically loadable namespace identifier associated with an application running on an analysis node that communicates with the multi-tier storage system over at least one network, and to instantiate a name node corresponding to the dynamically loadable namespace identifier. The name node may comprise, for example, a name node of a Hadoop distributed file system (HDFS), although other types of name nodes can be used in other embodiments. Particular objects of the object store of the capacity tier 108 are made accessible to the application via the name node. The term "dynamically loadable namespace" as used herein is intended to be broadly construed, so as to encompass, for example, a namespace that is loadable into a name node as needed, based at least in part on an identifier of that namespace. Moreover, the term "name node" is also intended to be broadly construed, and may represent, for example, a portion of another type of node, such as an IO node, implemented on a processing device of the system 100.

As noted above, the object store 111 of the capacity tier 108 is configured to store data in the form of objects having respective object identifiers. The translator 112 via the translation services 114 and the index tables 116 advantageously permits applications running on respective ones of the analysis nodes 102 that have no knowledge of the object storage structure of the object store 111 to access a specified set of objects corresponding to the dynamically loadable namespace identifier.

A given one of the index tables 116 is configured in the present embodiment to store multiple dynamically loadable namespace identifiers in association with respective corresponding object identifiers of respective dynamically loadable namespace objects stored in the object store 111 of the capacity tier 108.

For example, an entry of the given index table for one of the dynamically loadable namespace identifiers can include its associated object identifier and a location flag indicating if the corresponding name node is currently implemented in one or more of the fast tier 106, the capacity tier 108 or the translator 112. Thus, an instantiated name node corresponding to a particular dynamically loadable namespace identifier can be implemented in one of the tiers 106 or 108, or in the translator 112, or in combinations thereof, or in other system components, such as on one or more servers not explicitly shown in the figure.

Figure 6:
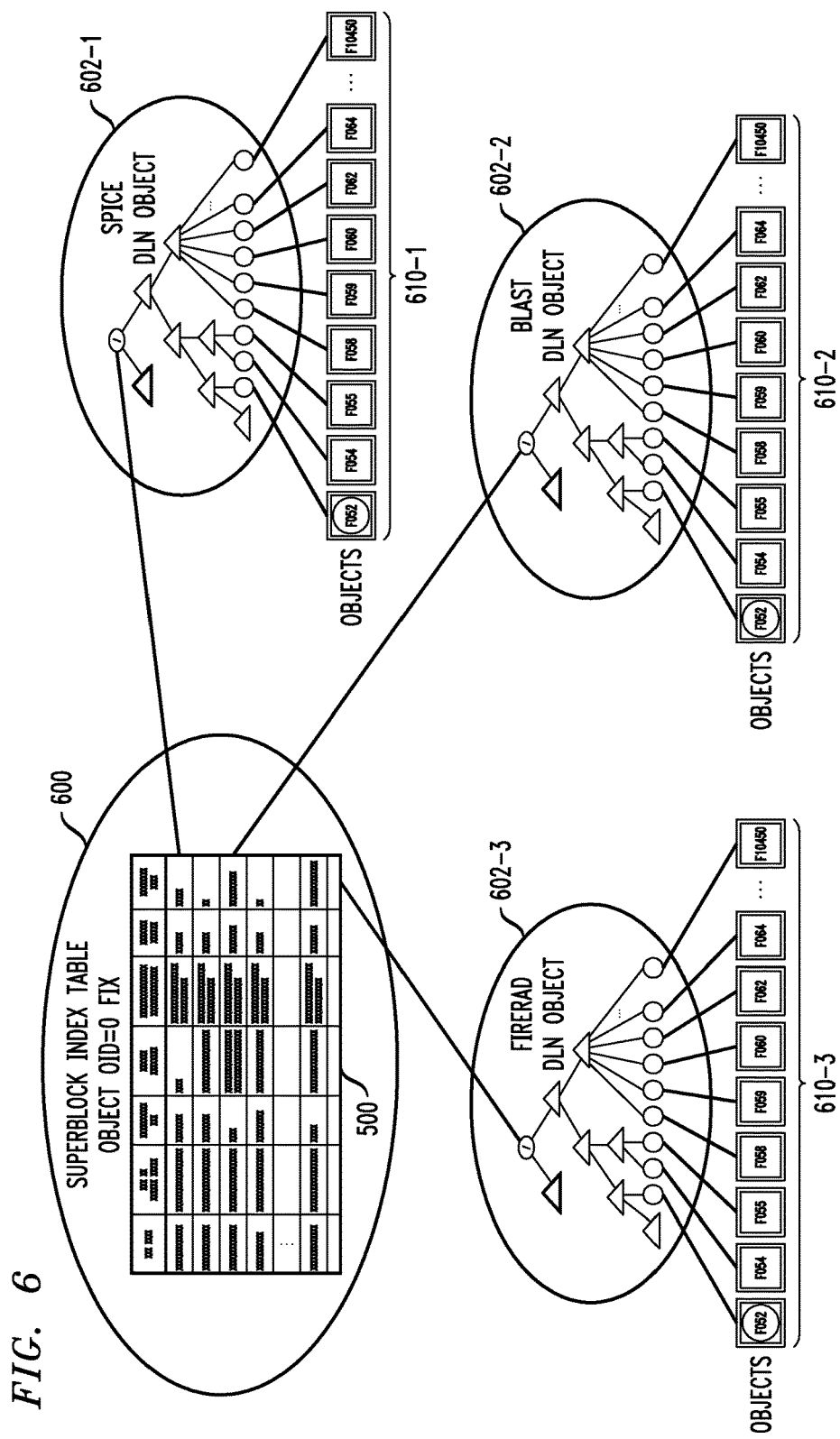
FIG. 6 illustrates relationships between an index table object, dynamically loadable namespace objects and additional underlying objects in one embodiment.

A more detailed example of an index table format will be shown and described in conjunction with FIGS. 5 and 6.

One or more of the index tables 116 can each be implemented at least in part as a superblock index table object of the object store 111 of the capacity tier 108.

Additionally or alternatively, a given one of the index tables 116 can be implemented at least in part as a key-value store in which the keys comprise respective ones of a plurality of dynamically loadable namespace identifiers. Numerous other index table formats can be used in other embodiments.

Each of the dynamically loadable namespace objects illustratively comprises identifiers of respective ones of a plurality of additional objects stored in the object store 111 of the capacity tier 108 and utilizable via the corresponding name node by an associated application running on one or more analysis nodes 102.

In some embodiments, the name node corresponding to the dynamically loadable namespace identifier provides the analysis node that runs the application with virtual links to the particular objects. An example of one embodiment of this type will be described in more detail below in conjunction with FIG. 7.

Additionally or alternatively, the name node corresponding to the dynamically loadable namespace identifier can be configured to provide the associated application with file mapping information for the particular objects so as to permit those objects to be utilized as respective files of an in-memory file system of the analysis node that runs the application.

The system 100 via the translator 112 is illustratively configured to build a separate name node for each dynamically loadable namespace supported by the system. Such namespaces are generally associated with respective different applications that may run on the analysis nodes 102. The translation services 114 and index tables 116 ensure that each application will access only those objects of the object store that are necessary or otherwise authorized for use in running the application. This advantageously allows multiple HDFS namespaces to be addressed within the system as if they formed a single unified namespace.

It is to be appreciated that these and other features of illustrative embodiments are presented by way of example only, and should not be construed as limiting in any way.

Accordingly, different numbers, types and arrangements of analysis nodes, storage tiers, data mover modules and translators can be used in other embodiments.

For example, although only a single data mover module 110 is shown in this embodiment, other embodiments can include multiple data mover modules. The data mover module 110 is illustratively coupled to the storage tiers 106 and 108 and configured to control transfer of data between the storage tiers. The term "data movement" as used in this and other contexts herein is intended to be broadly construed, so as to encompass data migration as well as other types of movement of data between storage tiers. A given data mover module can be implemented at least in part on storage arrays or other storage platforms that implement at least portions of one or more of the storage tiers 106 and 108.

Each of the storage tiers 106 and 108 in the FIG. 1 embodiment comprises a plurality of storage drives with different types of storage drives being used in different ones of the storage tiers. For example, the fast tier 106 may comprise flash drives while the capacity tier 108 comprises disk drives. The particular storage drives used in a given storage tier may be varied in other embodiments, and multiple distinct storage drive types may be used within a single storage tier. The term "storage drive" as used herein is intended to be broadly construed, so as to encompass, for example, disk drives, flash drives, solid state drives, hybrid drives or other types of storage products and devices.

The drives utilized in the fast tier 106 are generally significantly faster in terms of read and write access times than the drives utilized in the capacity tier 108. Accordingly, the fast tier 106 is a relatively small storage tier optimized for IO processing speed, while the capacity tier is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Also, the various tiers of a given multi-tier storage system in other embodiments need not be arranged as respective front-end and back-end storage tiers. Accordingly, numerous alternative storage tiering arrangements can be used in other embodiments.

The term "multi-tier storage system" as used herein is therefore intended to be broadly construed so as to encompass any of a wide variety of different storage tiers including, for example, two or more separate storage systems each comprising a single storage array. The term "storage tier" as used herein is also intended to be broadly construed, and may comprise, for example, a single storage array or a single-tier storage system.

In some embodiments, the fast and capacity tiers 106 and 108 of the multi-tier storage system 104 are arranged in the form of a 2 TIERS™ storage system from EMC Corporation of Hopkinton, Mass.

The data mover module 110 may be configured to control movement of data between the fast and capacity tiers 106 and 108 in order to facilitate achievement of desired levels of performance by the users.

The "users" in this embodiment may refer, for example, to respective ones of the analysis nodes 102, although the term "user" as utilized herein is intended to be broadly construed so as to encompass numerous other arrangements of human, hardware, software or firmware entities, as well as combinations of such entities.

The data mover module 110 can communicate with the fast and capacity tiers 106 and 108 via one or more application programming interfaces (APIs) or other types of communication media.

The storage tiers 106 and 108 and possibly other elements of the system 100 can be implemented using one or more storage platforms. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage arrays such as VNX® and Symmetrix VMAX® storage arrays, both commercially available from EMC Corporation of Hopkinton, Mass. Other types of storage products that can be used in implementing a given storage platform in an illustrative embodiment include object-based storage products such as Atmos, SDS products such as ViPR® or ScaleIO™, scale-out all-flash storage arrays such as XtremIO™, as well as scale-out NAS clusters comprising Isilon® platform nodes and associated accelerators in the S-Series, X-Series and NL-Series product lines, all commercially available from EMC Corporation.

These and other storage platforms can be part of what is more generally referred to herein as a processing platform comprising one or more processing devices each comprising a processor coupled to a memory, and the processing device may be implemented at least in part utilizing one or more virtual machines or other types of virtualization infrastructure such as Docker containers or other types of Linux containers (LXCs). The data mover module 110 and translator 112, as well as other system components, may be implemented at least in part using processing devices of such processing platforms.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 206, and is suitable for use in the system 100 but is more generally applicable to other types of systems comprising multiple storage tiers, at least one data mover module and an associated translator.

In step 200, a multi-tier storage system is provided. The storage system comprises a front-end storage tier, a back-end storage tier and a data mover module coupled to the front-end and back-end storage tiers to control movement of data between the storage tiers. With reference to the FIG. 1 embodiment, the front-end and back-end storage tiers illustratively comprise the respective fast and capacity tiers 106 and 108 and the data mover module comprises data mover module 110.

In step 202, a dynamically loadable namespace identifier is determined. The dynamically loadable namespace identifier is associated with an application running on an analysis node that communicates with the multi-tier storage system over at least one network. In the context of the FIG. 1 embodiment, the dynamically loadable namespace identifier is associated with an application running on one of the analysis nodes 102 and is determined by one of the translation services 114 of the translator 112 by reference to one or more of the index tables 116. For example, a given one of the index tables 116 illustratively stores a plurality of dynamically loadable namespace identifiers in association with respective corresponding object identifiers of respective dynamically loadable namespace objects stored in the object store 111 of the capacity tier 108. Each of the dynamically loadable namespace objects is associated with a different one of a plurality of applications that may be run by one or more of the analysis nodes. Thus, the determination in step 202 in some embodiments involves identifying an application running on one of the analysis nodes 102, and then translating an identifier of that application into a corresponding dynamically loadable namespace object using the index tables 116.

A given one of the index tables 116 of the translator 112 illustratively stores a plurality of dynamically loadable namespace identifiers in association with respective corresponding object identifiers of respective dynamically loadable namespace objects stored in the object store 111 of the capacity tier 108. The given index table can be implemented at least in part as a superblock index table object of the object store 111 of the capacity tier 108. Such an arrangement may more particularly utilize a key-value store in which the keys comprise respective ones of a plurality of dynamically loadable namespace identifiers.

In step 204, a name node corresponding to the dynamically loadable namespace identifier is configured. As mentioned previously, the name node is illustratively an HDFS name node, although other types of name nodes can be used in other embodiments. The term "name node" as used herein is intended to be broadly construed to encompass nodes or portions thereof that provide access to objects associated with a particular namespace.

Each of the dynamically loadable namespace objects may comprise identifiers of respective ones of a plurality of additional objects stored in the object store 111 of the capacity tier 108. The additional objects identified in a given one of the dynamically loadable namespace objects are utilizable via the corresponding name node by an associated application running on one or more analysis nodes 102.

In step 206, particular objects of an object store of the back-end storage tier are made accessible to the application via the name node. For example, in the FIG. 1 embodiment the name node corresponding to the dynamically loadable namespace identifier illustratively provides the analysis node 102 that runs the application with file mapping information for the particular objects so as to permit those objects to be utilized as respective files of an in-memory file system of the analysis node 102 that runs the application.

The access to the particular objects may be implemented at least in part by the name node corresponding to the dynamically loadable namespace identifier providing the associated application with virtual links to the particular objects.

Such an arrangement advantageously permits applications running on respective ones of the analysis nodes 102 and having no knowledge of the object storage structure of the object store 111 to access a specified set of objects corresponding to the dynamically loadable namespace identifier.

Figure 2:
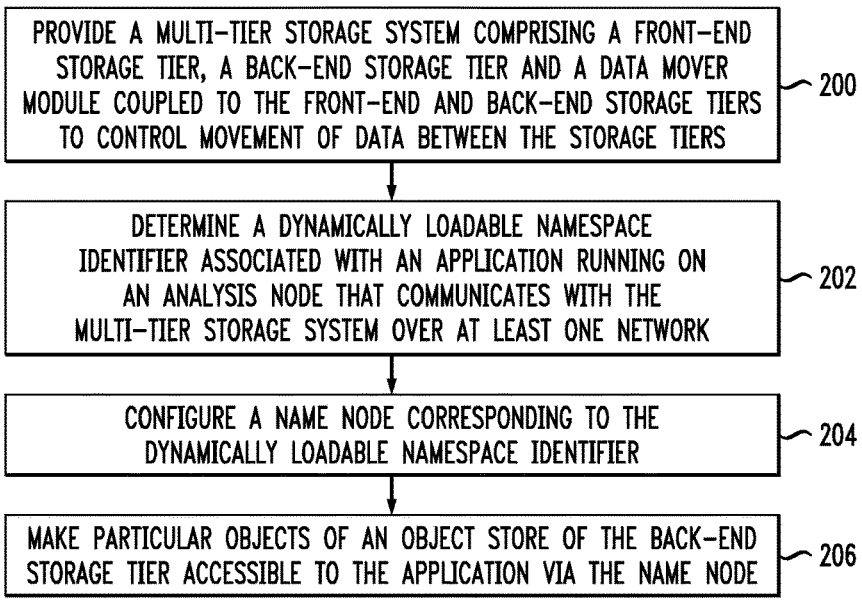
FIG. 2 is a flow diagram of an exemplary process implemented using the translator in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations involving multiple storage tiers at least one of which includes an object store. For example, the ordering of the process steps may be varied in other embodiments, or certain steps may be performed concurrently with one another rather than serially. Also, one or more of the process steps may be repeated periodically for different applications running on the analysis nodes, or multiple instances of the process can be performed in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
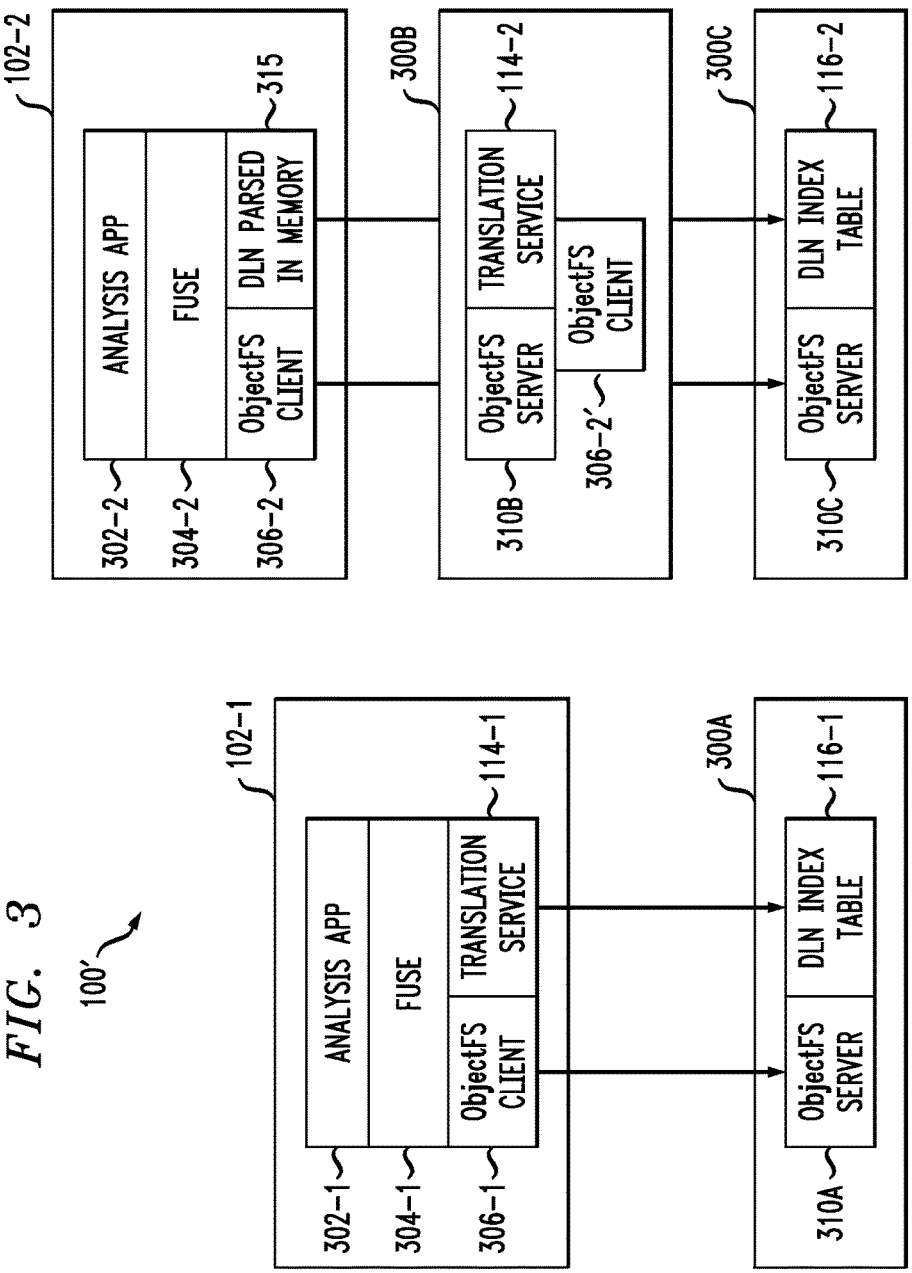
FIG. 3 shows another illustrative embodiment of an information processing system comprising a multi-tier storage system and an associated translator for configuring a name node.

Another illustrative embodiment will now be described in more detail with reference to FIG. 3. In this embodiment, an information processing system 100' is shown, including first and second analysis nodes 102-1 and 102-2 which correspond to two of the analysis nodes 102 described in conjunction with the FIG. 1 embodiment. The system 100' is assumed to be configured in substantially the same manner as system 100 of FIG. 1, so as to include analysis nodes 102, multi-tier storage system 104 and translator 112, but as shown in FIG. 3 comprises additional nodes 300A, 300B and 300C. Portions of the translator 112 are implemented using the analysis nodes 102-1 and 102-2 and the additional nodes 300A, 300B and 300C in this embodiment. Moreover, one or more of the additional nodes 300A, 300B and 300C are assumed to be implemented in or otherwise associated with the multi-tier storage system in this embodiment.

The analysis node 102-1 in this embodiment comprises an analysis application 302-1 and a FUSE file system 304-1, where FUSE denotes "file system in userspace." Also included in the analysis node 102-1 is an object file system ("ObjectFS") client 306-1 and a translation service 114-1. The ObjectFS client 306-1 interacts with an ObjectFS server 310A implemented in additional node 300A. The translation service 114-1 interacts with an index table 116-1 for accessing dynamically loadable namespaces or DLNs. The index table 116-1 is therefore also referred to herein as a DLN index table.

Through the translation service 114-1 and index table 116-1, a dynamically loadable namespace identifier associated with the analysis application 302-1 is determined, and a name node corresponding to the dynamically loadable namespace identifier is instantiated. Particular objects of the object store 111 of the capacity tier 108 are thereby made accessible to the application 302-1 via the name node.

The analysis node 102-2 is configured in a different manner than the analysis node 102-1. Like the analysis node 102-1, the analysis node 102-2 in this embodiment comprises an analysis application 302-2, a FUSE file system 304-2 and an ObjectFS client 306-2. However, instead of a translation service, the analysis node 102-2 includes a dynamically loadable namespace 315 or DLN that is parsed in memory of the analysis node 102-2. The ObjectFS client 306-2 interacts with an ObjectFS server 310B implemented in additional node 300B. The dynamically loadable namespace 315 interacts with a translation service 114-2 that is also implemented in additional node 300B. The additional node 300B further comprises an ObjectFS client 306-2' that is configured to interact with an ObjectFS server 310C implemented on additional node 300C. The translation service 114-2 on node 300B interacts with a DLN index table 116-2 implemented on additional node 300C.

In a manner similar to that described above for the case of analysis node 102-1, but now through the translation service 114-2 and index table 116-2, a dynamically loadable namespace identifier is associated with the analysis application 302-2 is determined, and a name node corresponding to the dynamically loadable namespace identifier is instantiated. Particular objects of the object store 111 of the capacity tier 108 are thereby made accessible to the application 302-2 via the name node.

The FIG. 3 embodiment illustrates that one or more of the translation services 114 of the translator 112 can be implemented on respective analysis nodes 102 that run respective applications 302. Additionally or alternatively, one or more of the translation services 114 of the translator 112 can be implemented on respective servers 300 that are separate from the analysis nodes 102. The additional servers such as 300A, 300B and 300C in the FIG. 3 embodiment can each serve multiple analysis nodes rather than only a single analysis node 102-1 or 102-2 as illustrated in the figure.

In operation, analysis application 302-1 or 302-2 running on analysis node 102-1 or 102-2 accesses the translation service 114-1 or 114-2. The translation service consults the appropriate DLN index table 116-1 or 116-2 and loads or otherwise instantiates the name node matching the specific dynamically loadable namespace for that application. The name node provides the application with access to only those objects of the object store 111 that are associated with the specific dynamically loadable namespace.

It should be understood that the particular node and component configurations illustrated in FIG. 3 are presented by way of illustrative example only, and should not be construed as limiting in any way.

Figure 4:
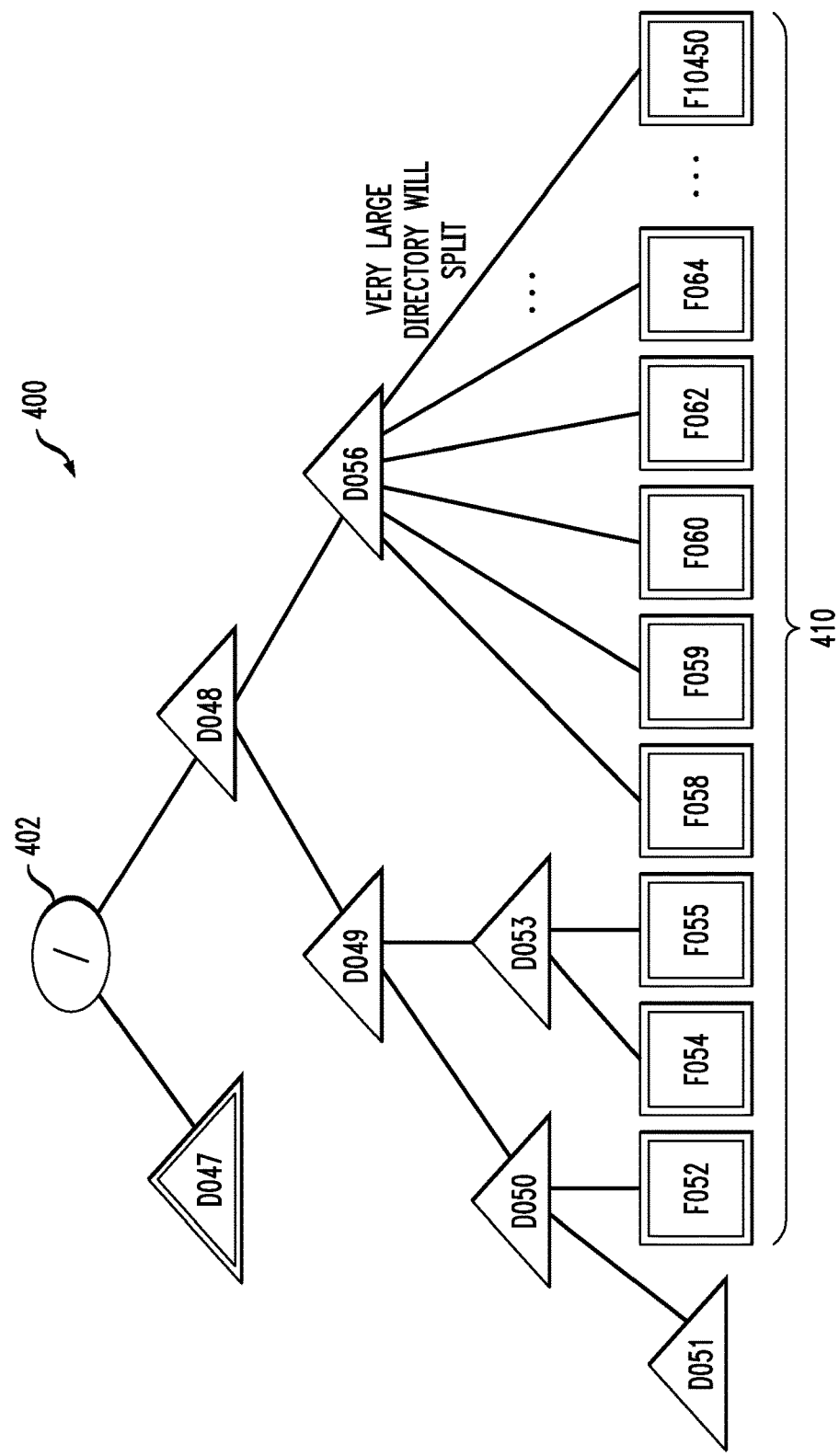
FIG. 4 shows an example of a dynamically loadable namespace in an illustrative embodiment.

Referring now to FIG. 4, an example of a dynamically loadable namespace 400 in an illustrative embodiment is shown. The dynamically loadable namespace 400 in this embodiment is assumed to be identified by a dynamically loadable namespace identifier and comprises a root element 402 and a plurality of directories shown as triangular-shaped elements denoted D047, D048, D049, D050, D051, D053 and D056. Certain ones of the directories are associated with one or more objects 410 denoted F052, F054, F055, F058, F059, F060, F062, F064, . . . F010450. More particularly, directory D050 includes object F052, directory D053 includes objects F054 and F055, and directory D056 includes F058 through F010450. The directory D056 is therefore a very large directory in this example and accordingly may be split into several subdirectories that are not explicitly shown. The objects 410 illustratively comprise objects stored in the object store 111 of the capacity tier 108.

Instantiation of a name node corresponding to the dynamically loadable namespace 400 provides applications running on one or more of the analysis nodes 102 with access to at least a subset of the objects 410. The dynamically loadable namespace format illustrated in FIG. 4 is presented by way of example only, and numerous other namespace formats can be used in other embodiments.

FIG. 5 shows an example of an index table 500 which represents one of the index tables 116 of the translator 112. The index table 500 stores multiple dynamically loadable namespace identifiers, illustratively DLN names, in association with respective corresponding OIDs of respective dynamically loadable namespace objects stored in the object store 111 of the capacity tier 108. For example, in the first row of the table 500, a DLN name denoted SPICE-1-DLN.v1 is associated with an OID 2.16.840.1.113883.3.1. Other DLN names such as SPICE-1-DLN.v2, SPICE-2-DLN.v1, BLAST-DLN.v1 and FIRERAD-DLN.v1, are similarly each associated with a unique OID identifying a corresponding dynamically loadable namespace object stored in the object store 111. The DLN names are generally associated with respective analysis applications running on the analysis nodes.

The index table 500 provides sufficient information to allow a name node corresponding to the dynamically loadable namespace to be instantiated. For example, such a name node or a portion thereof can be instantiated in the fast tier 106 using the corresponding DLN object retrieved from the object store 111 of the capacity tier. As another example, the name node or a portion thereof can be instantiated in one of the analysis nodes 102 using a local memory of that analysis node.

As mentioned previously, the instantiated name node can illustratively comprise an HDFS name node. Accordingly, the OID of the DLN object can be replaced with a file path to a DLN file stored using HDFS on the capacity tier 108. However, it is to be appreciated that other types of name nodes can be used.

In addition to the DLN OIDs corresponding to the respective DLN names, the index table 500 in this example further provides, for each of the DLN names, permissions/ACLs ("access control lists"), OIDs of any other DLNs related to the DLN name, a checksum computed over the DLN object and/or an associated archive file (e.g., a ".tar" file), a sharing status and a location flag. The permissions/ACLs ensure that only authorized users will be able to access the instantiated name node corresponding to the DLN name. The related DLNs may comprise, for example, other DLNs that are related to a given DLN and that are loaded together by a single analysis application. The checksum can be used to detect tampering or other errors in the DLN object. The sharing status is in the form of a flag indicating whether or not the given DLN is shared by multiple applications currently running on the analysis nodes 102. The location flag indicates if the given DLN is currently loaded in the fast tier 106 or resident in the capacity tier 108, which are denoted as respective FT and CT in the table entries. It is also possible that the given DLN is in use by the translator 112, which is also indicated by the location flag. The location flag can therefore be used to indicate, for example, if the corresponding name node is currently implemented in one or more of the fast tier 106, the capacity tier 108 or the translator 112.

Each of the DLN OIDs in the second column of the table illustratively comprises identifiers of respective ones of a plurality of additional objects stored in the object store 111 of the capacity tier 108. These additional objects are utilizable via the corresponding name node by an associated application running on one or more analysis nodes 102.

FIG. 6 illustrates relationships between an index table object, dynamically loadable namespace objects and additional underlying objects in one embodiment. In this embodiment, the index table 500 previously described in conjunction with FIG. 5 is implemented as a superblock index table object 600 of the object store 111 of the capacity tier 108.

Different DLN names from the index table correspond to respective different DLN objects having respective DLN OIDs. Examples of such DLN objects include DLN objects 602-1, 602-2 and 602-3, corresponding to respective DLN names of the index table 500. More particularly, the DLN objects 602 correspond to respective ones of the DLN names corresponding to SPICE, BLAST and FIRERAD applications in the index table 500.

The DLN objects 602-1, 602-2 and 602-3 identify respective sets of underlying objects 610-1, 610-2 and 610-3 utilized by respective ones of the SPICE, BLAST and FIRERAD applications running on respective ones of the analysis nodes 102. Although not expressly shown as such in the figure, the underlying objects 610 may comprise different sets of objects for each of the DLN objects 602.

Other illustrative embodiments of information processing systems each comprising a multi-tier storage system and an associated translator for configuring a name node will now be described with reference to FIGS. 7 and 8.

Figure 7:
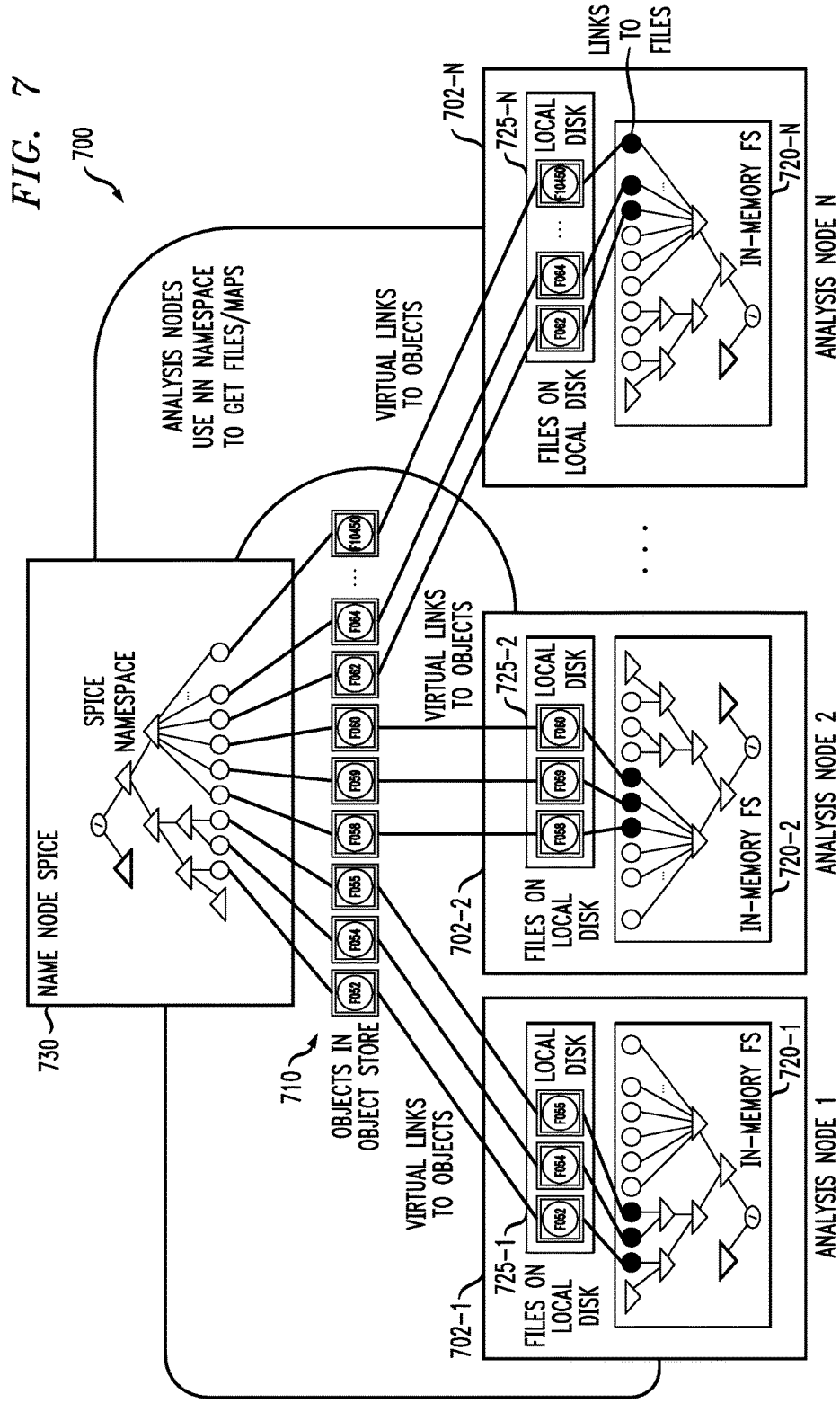
FIGS. 7 and 8 show other illustrative embodiments of information processing systems each comprising a multi-tier storage system and an associated translator for configuring a name node.

Referring first to FIG. 7, an information processing system 700 comprises a plurality of analysis nodes 702-1, 702-2, . . . 702-N. The analysis nodes 702 each run a SPICE application that needs to access objects 710. The objects 710 are assumed to be stored on an object store of a back-end storage tier of a multi-tier storage system, although such elements of the system 700 are not explicitly shown in the figure. The analysis nodes 702-1, 702-2, . . . 702-N comprise respective in-memory file systems 720-1, 720-2, . . . 720-N and respective sets of files on respective local disks 725-1, 725-2, . . . 725-N. A name node 730 is instantiated by a translator that is not explicitly shown in the figure.

The in-memory file systems 720 of the analysis nodes 702 each include the dynamically loadable SPICE namespace of the SPICE name node 730 parsed into their respective memories. Such an arrangement is similar to the DLN 315 parsed into memory of analysis node 102-2 in the FIG. 3 embodiment.

The analysis nodes 702 utilize the SPICE namespace of the instantiated SPICE name node 730 to configure their respective in-memory file systems 720 and to obtain any needed ones of the objects 710 as respective files on their local disks 725. More particularly, in this embodiment the name node 730 corresponding to the dynamically loadable namespace identifier of the SPICE namespace provides the associated SPICE applications running on the analysis nodes 702 with virtual links to the objects 710. The name node 730 additionally or alternatively provides the analysis nodes 702 that run the SPICE application with file mapping information for the particular objects 710 so as to permit at least a subset of those objects to be utilized as respective files of the in-memory file systems 720. At least a subset of the objects made accessible via the name node 730 in such an arrangement are mapped to files on the local disks 725 using the respective in-memory file systems 720.

Figure 8:
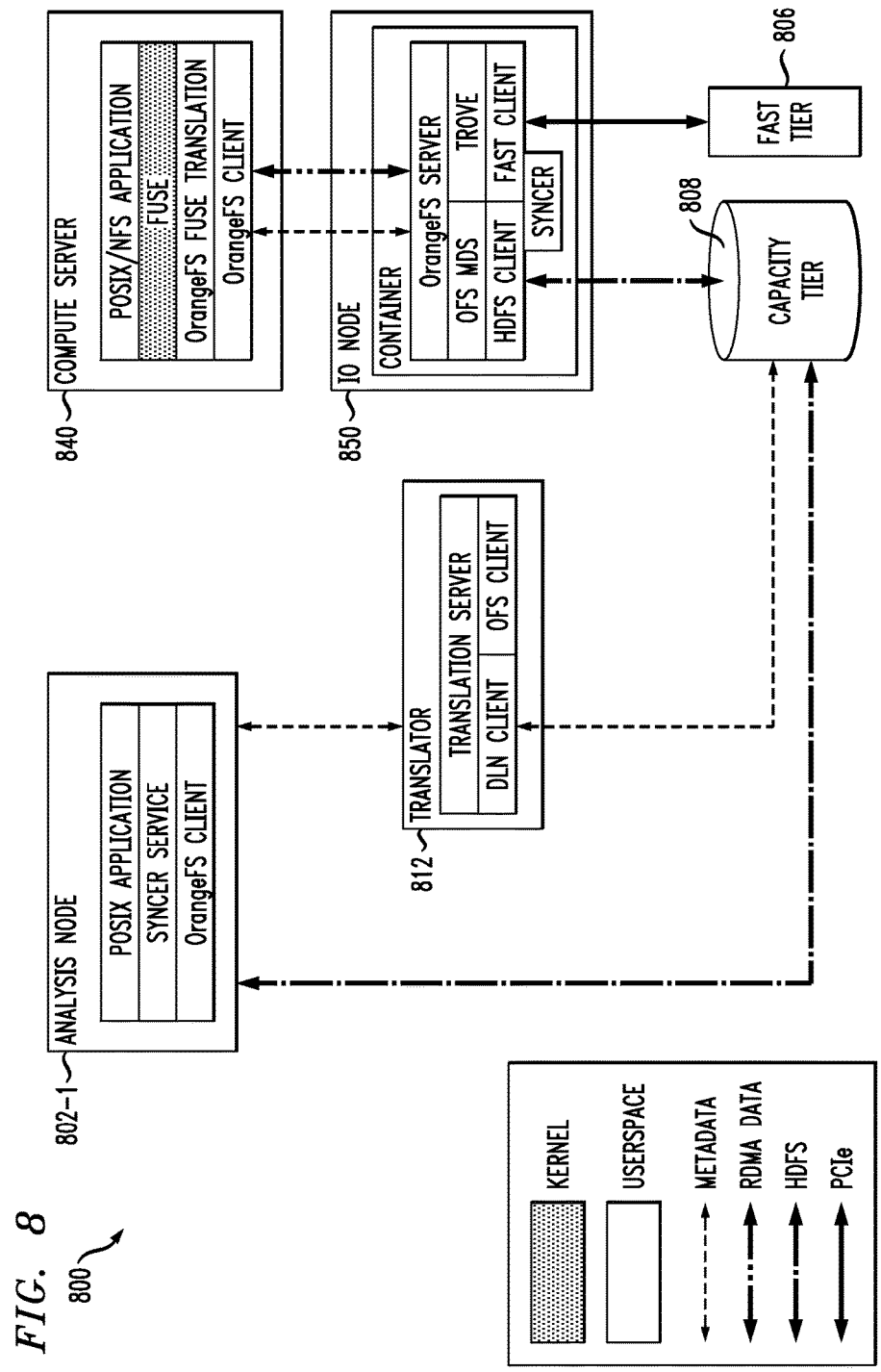

An information processing system 800 in accordance with an illustrative embodiment is shown in FIG. 8. The information processing system 800 comprises an analysis node 802-1, a multi-tier storage system comprising a fast tier 806 and a capacity tier 808, and a translator 812. The system 800 further comprises a compute server 840 and an IO node 850. The analysis node 802-1 includes a POSIX application, a synchronizer ("SYNCer") service and an Orange file system ("OrangeFS") client. The analysis node has a remote direct memory access (RDMA) connection with the capacity tier 808 and a metadata connection with the translator 812. The translator 812 includes a translation service, a dynamically loadable namespace client ("DLN client") and an OrangeFS client. The translation service utilizes an index table accessible via the DLN client to obtain a DLN object from the capacity tier 808. This DLN object is utilized to instantiate a name node accessible to the analysis node 802-1.

The compute server 840 comprises a POSIX/NFS application, a FUSE component, an OrangeFS FUSE translation element, and an OrangeFS client. It may be viewed as an analysis node of the system 800 that does not utilize the translator 812. The FUSE component is assumed to be implemented in kernel space, while all other components of system elements 802-1, 812, 840 and 850 are assumed to be implemented in user space.

The IO node 850 is illustratively part of the multi-tier storage system that includes fast tier 806 and capacity tier 808. The IO node 850 comprises an OrangeFS server, an OrangeFS metadata server ("OFS MDS"), an OrangeFS "trove" subsystem, an HDFS client and a SYNCer element. These elements run in a container of the IO node 850. The fast client communicates over a PCIe connection with the fast tier 806. The HDFS client communicates with the capacity tier 808 using HDFS communication protocols. The IO node 850 in some embodiments can be used to instantiate a name node for a particular dynamically loadable namespace.

The OrangeFS elements in the FIG. 8 embodiment can be replaced in other embodiments with corresponding components of another type of parallel virtual file system or distributed file system, or more generally corresponding components of another type of file system.

It is to be appreciated that numerous alternative arrangements of information processing systems comprising multi-tier storage systems and associated translators providing controlled access to objects can be configured in other embodiments.

Illustrative embodiments can provide a number of significant advantages relative to conventional arrangements.

For example, some embodiments allow for translation-based controlled partitioning of an object store such that an individual application can access only a limited number of the objects associated with corresponding dynamically loadable namespace. However, the total number of objects that can be controlled across multiple applications using respective dynamically loadable namespaces is essentially unlimited. Accordingly, some embodiments are scalable to essentially unlimited numbers of objects that may be stored in one or more object stores of at least one back-end storage tier.

Also, the use of one or more index tables each of which can illustratively be configured as a superblock index table object allows all of the objects of the object store to be addressed as a unified namespace.

Some embodiments therefore overcome drawbacks of conventional practice which would otherwise prevent applications running on analysis nodes from directly accessing objects stored in an object store of a capacity tier or other back-end storage tier.

In illustrative embodiments, applications can easily identify and access the particular objects that are needed for their execution even though the applications have no knowledge of the structure of the object store in which those objects reside. It is therefore possible to execute the applications in different processing environments in order to meet different processing goals. For example, a user may run an analysis application on the multi-tier storage system 104 in a private data center to get the fastest possible compute time on a business critical problem. Later the user can rerun the same application and look at different non-critical results that do not require fast flash storage. In this processing environment, the analysis application can access the needed objects as files on local disk of a home office cloud. Numerous alternative processing environments can utilize the dynamically loadable namespace to access the particular objects associated with a corresponding application.

It is to be appreciated that the particular types of translation-based object access functionality illustrated in FIGS. 1-8 and the associated advantages described above are exemplary only, and numerous other arrangements may be used in other embodiments.

For example, the disclosed techniques may be adapted in a straightforward manner for providing translation-based object access in multi-tier storage systems including a wide variety of storage tier configurations other than those described in conjunction with the illustrative embodiments. Also, the particular configuration of the translator 112 and its translation service and index table components can be varied, and distributed in different ways over servers, nodes or other system components.

It was noted above that portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

One illustrative embodiment of a processing platform that may be used to implement at least a portion of system 100 comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system 100.

Another illustrative embodiment of a processing platform that may be used to implement at least a portion of the system 100 comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Again, these particular processing platforms are presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, such as container-based virtualization infrastructure using Docker containers or other types of containers, in place of or in addition to virtualization infrastructure comprising virtual machines.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of the system 100 as disclosed herein can be implemented at least in part in the form of one or more software programs stored in memory and executed by a processor of a processing device such as a virtual machine or a container. For example, the data mover module 110 and the translator 112 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems, analysis nodes, storage systems and storage tiers that can benefit from translation-based controlled object access for applications. Also, the particular configurations of system and device elements shown in FIGS. 1, 3, 7 and 8 and the process operations shown in FIG. 2 can be varied in other embodiments. Thus, for example, the particular type of front-end storage tiers, back-end storage tiers, data mover modules and translators deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a multi-tier storage system comprising a front-end storage tier, a back-end storage tier and a data mover module coupled to the front-end and back-end storage tiers and configured to control movement of data between the storage tiers; and
a translator associated with the multi-tier storage system; the translator implementing a plurality of translation services and one or more index tables;
a given one of the translation services being configured:
to access at least one of the one or more index tables in order to determine a dynamically loadable namespace identifier associated with an application running on an analysis node that communicates with the multi-tier storage system over at least one network; and
to instantiate a name node corresponding to the dynamically loadable namespace identifier;
the dynamically loadable namespace identifier identifying a dynamically loadable namespace that comprises at least a root element and a plurality of directories;
wherein particular objects of an object store of the back-end storage tier are made accessible to the application via the name node;
wherein a given one of the one or more index tables stores a plurality of dynamically loadable namespace identifiers, for respective different application types, in association with respective corresponding object identifiers of respective dynamically loadable namespace objects stored in the object store of the back-end storage tier, the dynamically loadable namespace objects identifying respective different sets of objects of the object store that are accessible to respective applications of the respective different application types;
wherein a given entry of the given index table for one of the dynamically loadable namespace identifiers comprises its associated object identifier and a location flag indicating if the corresponding name node is currently implemented in one or more of the front-end storage tier, the back-end storage tier and the translator; and
wherein the apparatus is implemented using at least one processing device comprising a processor coupled to a memory.

2. The apparatus of claim 1 wherein the translator is implemented at least in part within the multi-tier storage system.

3. The apparatus of claim 1 wherein the front-end storage tier comprises a fast tier having a relatively high input-output processing speed and a relatively low capacity and the back-end storage tier comprises a capacity tier having a relatively low input-output processing speed and a relatively high capacity.

4. The apparatus of claim 1 wherein at least a subset of the translation services of the translator are implemented on respective analysis nodes that run respective applications and are configured to access the multi-tier storage system over at least one network in conjunction with running of the respective applications.

5. The apparatus of claim 1 wherein at least a subset of the translation services of the translator are implemented on respective servers that are separate from analysis nodes that are configured to access the multi-tier storage system over at least one network.

6. The apparatus of claim 1 wherein the object store of the back-end storage tier is configured to store data in the form of objects having respective object identifiers and wherein the translator via the translation services and the at least one index table permits applications running on respective analysis nodes having no knowledge of the object storage structure of the object store to access a specified set of objects corresponding to the dynamically loadable namespace identifier.

7. The apparatus of claim 1 wherein a given one of the dynamically loadable namespace objects comprises identifiers of respective ones of a plurality of additional objects stored in the object store of the back-end storage tier and utilizable via the corresponding name node by an associated application running on one or more analysis nodes.

8. The apparatus of claim 1 wherein the name node corresponding to the dynamically loadable namespace identifier provides the analysis node that runs the application with virtual links to the particular objects.

9. The apparatus of claim 1 wherein the name node corresponding to the dynamically loadable namespace identifier provides the analysis node that runs the application with file mapping information for the particular objects so as to permit those objects to be utilized as respective files of an in-memory file system of the analysis node that runs the application.

10. The apparatus of claim 1 wherein a given one of the one or more index tables is implemented at least in part as a superblock index table object of the object store of the back-end storage tier.

11. The apparatus of claim 1 wherein a given one of the one or more index tables is implemented at least in part as a key-value store in which the keys comprise respective ones of a plurality of dynamically loadable namespace identifiers.

12. An information processing system comprising the apparatus of claim 1 and a plurality of analysis nodes each of which communicate with the multi-tier storage system over at least one network.

13. A method comprising:
providing a multi-tier storage system comprising a front-end storage tier, a back-end storage tier and a data mover module coupled to the front-end and back-end storage tiers to control movement of data between the storage tiers;
providing a translator associated with the multi-tier storage system, the translator implementing a plurality of translation services and one or more index tables;
determining, in conjunction with a given one of the translation services that accesses at least one of the one or more index tables, a dynamically loadable namespace identifier associated with an application running on an analysis node that communicates with the multi-tier storage system over at least one network; and
configuring a name node corresponding to the dynamically loadable namespace identifier;
wherein the dynamically loadable namespace identifier identifying a dynamically loadable namespace that comprises at least a root element and a plurality of directories;
wherein particular objects of an object store of the back-end storage tier are made accessible to the application via the name node;
wherein the name node is configured at least in part utilizing an index table that stores a plurality of dynamically loadable namespace identifiers, for respective different application types, in association with respective corresponding object identifiers of respective dynamically loadable namespace objects stored in the object store of the back-end storage tier, the dynamically loadable namespace objects identifying respective different sets of objects of the object store that are accessible to respective applications of the respective different application types;
wherein a given entry of the index table for one of the dynamically loadable namespace identifiers comprises its associated object identifier and a location flag indicating if the corresponding name node is currently implemented in one or more of the front-end storage tier, the back-end storage tier and the translator; and
wherein the providing, determining and configuring are implemented using at least one processing device comprising a processor coupled to a memory.

14. The method of claim 13 wherein the determining and configuring are implemented at least in part utilizing the translation service that accesses the index table that stores the plurality of dynamically loadable namespace identifiers.

15. The method of claim 13 wherein the name node corresponding to the dynamically loadable namespace identifier provides the analysis node that runs the application with file mapping information for the particular objects so as to permit those objects to be utilized as respective files of an in-memory file system of the analysis node that runs the application.

16. A non-transitory processor-readable storage medium having stored therein program code of one or more software programs, for use in conjunction with a multi-tier storage system comprising a front-end storage tier, a back-end storage tier and a data mover module coupled to the front-end and back-end storage tiers to control movement of data between the storage tiers, the multi-tier storage system being associated with a translator implementing a plurality of translation services and one or more index tables, wherein the program code when executed by at least one processing device causes said processing device:
to determine, in conjunction with a given one of the translation services that accesses at least one of the one or more index tables, a dynamically loadable namespace identifier associated with an application running on an analysis node that communicates with the multi-tier storage system over at least one network; and
to configure a name node corresponding to the dynamically loadable namespace identifier;
the dynamically loadable namespace identifier identifying a dynamically loadable namespace that comprises at least a root element and a plurality of directories;
wherein particular objects of an object store of the back-end storage tier are made accessible to the application via the name node;
wherein the name node is configured at least in part utilizing an index table that stores a plurality of dynamically loadable namespace identifiers, for respective different application types, in association with respective corresponding object identifiers of respective dynamically loadable namespace objects stored in the object store of the back-end storage tier, the dynamically loadable namespace objects identifying respective different sets of objects of the object store that are accessible to respective applications of the respective different application types; and
wherein a given entry of the index table for one of the dynamically loadable namespace identifiers comprises its associated object identifier and a location flag indicating if the corresponding name node is currently implemented in one or more of the front-end storage tier, the back-end storage tier and the translator.

17. The processor-readable storage medium of claim 16 wherein the determining and configuring are implemented at least in part utilizing the translation service that accesses the index table that stores the plurality of dynamically loadable namespace identifiers.

18. The processor-readable storage medium of claim 16 wherein the name node corresponding to the dynamically loadable namespace identifier provides the analysis node that runs the application with file mapping information for the particular objects so as to permit those objects to be utilized as respective files of an in-memory file system of the analysis node that runs the application.

19. The processor-readable storage medium of claim 16 wherein a given one of the one or more index tables is implemented at least in part as a key-value store in which the keys comprise respective ones of a plurality of dynamically loadable namespace identifiers.

20. The processor-readable storage medium of claim 16 wherein a given one of the dynamically loadable namespace objects comprises identifiers of respective ones of a plurality of additional objects stored in the object store of the back-end storage tier and utilizable via the corresponding name node by an associated application running on one or more analysis nodes.

* * * * *